United States Patent
Stanciu et al.

(10) Patent No.: US 9,100,115 B1
(45) Date of Patent: Aug. 4, 2015

(54) PROCESSOR UNIT FOR DETERMINING A QUALITY INDICATOR OF A COMMUNICATION CHANNEL AND A METHOD THEREOF

(71) Applicants: Mihai-Ionut Stanciu, Bucharest (RO); Victor-Florin Crasmariu, Bucharest (RO)

(72) Inventors: Mihai-Ionut Stanciu, Bucharest (RO); Victor-Florin Crasmariu, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/288,525

(22) Filed: May 28, 2014

(30) Foreign Application Priority Data

Mar. 28, 2014 (RO) .............................. A 2014 00240

(51) Int. Cl.
*H04B 3/46* (2015.01)
*H04B 17/00* (2015.01)

(52) U.S. Cl.
CPC .......... *H04B 17/008* (2013.01); *H04B 17/0097* (2013.01)

(58) Field of Classification Search
USPC ......... 375/268, 271, 279, 303, 316, 322, 324, 375/325, 334, 346, 348, 350
See application file for complete search history.

(56) References Cited

U.S. PATENT DOCUMENTS

| | | | |
|---|---|---|---|
| 6,898,198 B1 * | 5/2005 | Ryan et al. ..................... | 370/338 |
| 7,190,741 B1 | 3/2007 | Manning | |
| 8,116,363 B2 | 2/2012 | Shafeeu | |
| 2002/0064233 A1 * | 5/2002 | Terreault et al. .............. | 375/261 |
| 2009/0175181 A1 * | 7/2009 | Kim et al. ..................... | 370/252 |
| 2010/0172423 A1 * | 7/2010 | Chrabieh ....................... | 375/260 |
| 2010/0208853 A1 | 8/2010 | Qian et al. | |
| 2010/0272195 A1 | 10/2010 | Rao et al. | |
| 2011/0090944 A1 * | 4/2011 | Kim et al. ..................... | 375/227 |
| 2012/0254703 A1 * | 10/2012 | Rubin ........................... | 714/784 |

FOREIGN PATENT DOCUMENTS

CN 101938450 B 2/2013
WO 2012044098 A2 4/2012

\* cited by examiner

*Primary Examiner* — Khanh C Tran

(57) ABSTRACT

A processor unit used to determine a quality indicator, QI, of a communication channel. The processor unit receives received complex symbols at an input, executes a predetermined sequence of transformations on the received complex symbols and computes the error vector magnitude, EVM. The quality indicator, QI, of the communication channel is determined based on the determined error vector magnitude, EVM. Data representing the quality indicator, QI, is outputted at an output of the processor unit. The predetermined sequence of transformations transfers all the received complex symbols to a single predetermined region containing a single target location. The error vector magnitude, EVM, is then calculated as average distance of all the processed received complex symbols in the predetermined single region to the single target location.

18 Claims, 9 Drawing Sheets

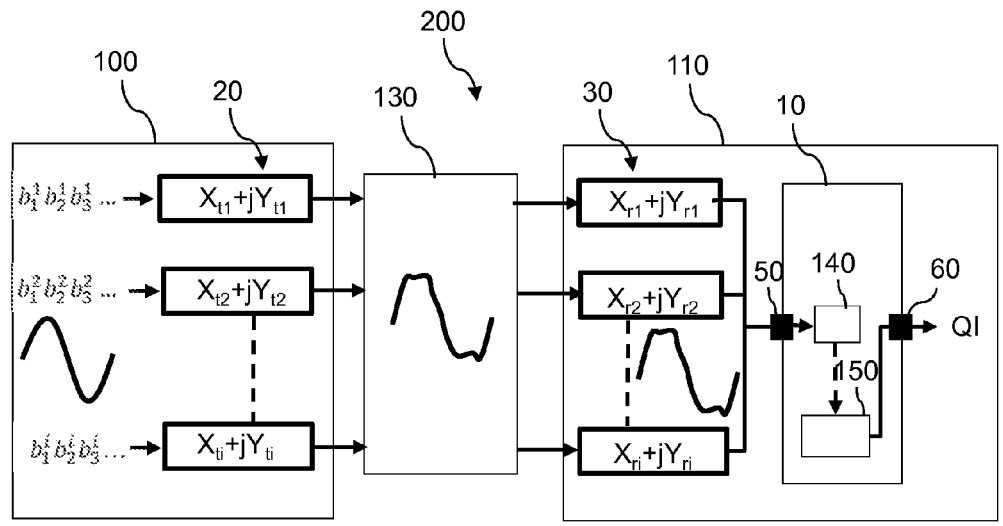
FIG. 1
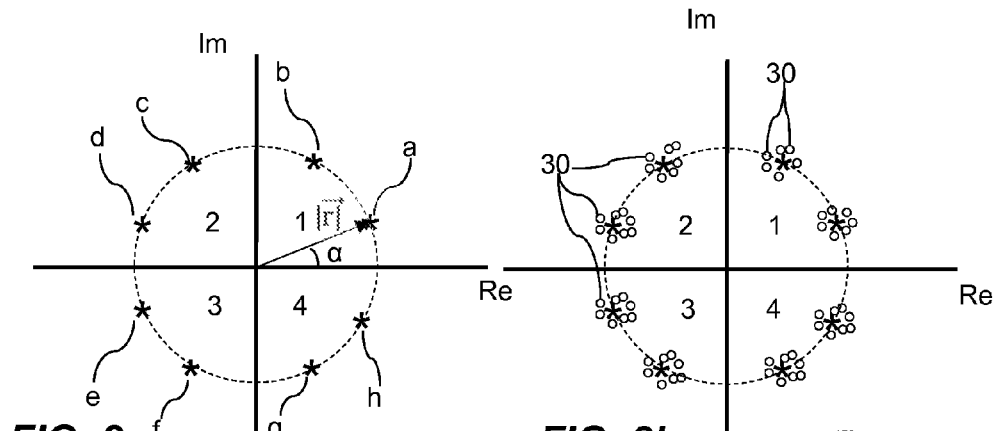
FIG. 2a  FIG. 2b
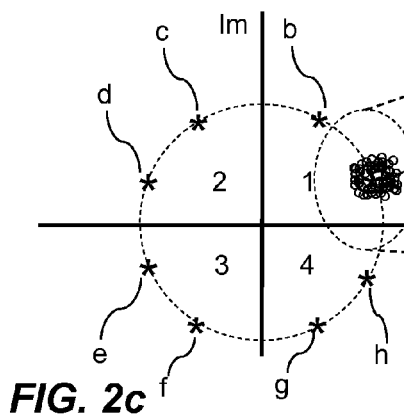
FIG. 2c  FIG. 2d

PROCESSOR UNIT FOR DETERMINING A QUALITY INDICATOR OF A COMMUNICATION CHANNEL AND A METHOD THEREOF

CROSS REFERENCE TO RELATED APPLICATIONS

The present application claims priority to Romanian Patent Application No. RO A 2014 00240, filed Mar. 28, 2014, entitled "A PROCESSOR UNIT FOR DETERMINING A QUALITY INDICATOR OF A COMMUNICATION CHANNEL AND A METHOD THEREOF," the entirety of which is herein incorporated by reference.

FIELD OF THE INVENTION

This invention relates to a processor unit for determining a quality indicator of a communication channel. The invention also relates to a receiver, a digital communications system, and to a method of determining the quality indicator in the communication channel. The invention further relates to a computer readable medium.

BACKGROUND OF THE INVENTION

In communications systems using digital modulation schemes and transmitting information through a communication channel, information is transmitted through the communication channel by for example a signal at a predetermined carrier frequency which is modulated according to the information to be transmitted. Any reliably detectable change in or value of a physical parameter (e.g., amplitude, phase, frequency, etc.) of the signal sent by a transmitter of the communications system may reflect the information and, to retrieve the information, the change or value may be detected and demodulated by a receiver of the communications system. Thus, a conversion of the information from a binary or digital format to an analogue signal is typically required to determine the change or the value of the parameter before the signal can be transmitted.

The conversion of the information from the digital format to the analogue signal is typically performed in the transmitter in a converter unit that converts a digital value into a specific value out of a discrete set of M preset values (M being a positive integer) hereinafter referred to as the modulation signal set, for a modulated parameter, for example the phase, the amplitude or the frequency of the modulated signal.

Preceding the conversion, the digital value may be obtained e.g. by forming a symbol of N bits from a stream of bits in a manner that each symbol has a value out of a set of M discrete values ($M=2^N$). It is typical that this conversion is performed by first mapping the digital value to a complex symbol or complex value with a real part and an imaginary part out of a set of M complex values, hereinafter referred to as the constellation set, using some predefined mapping scheme. The real part and the imaginary part are then used to define respectively an in-phase component and a quadrature component, i.e. the component with 90° degree phase shift with respect to the in-phase component, of the modulated signal transmitting the information. Thus, each point in the constellation set corresponds one to one to a single point in the modulation signal set.

Processing operations effected on the signal transmitted through the communication channel affect the signal and introduce noise. When the signal carrying the information reaches the receiver, the originally transmitted signal is corrupted by noise, which may depend for example upon the propagation conditions of the signal through the communication channel, noise introduced by the transmitter and by the receiver, etc. The received signal detected and demodulated by the receiver may thus have distorted in-phase and quadrature components relative to the in-phase and quadrature components of the originally transmitted signal. The distorted in-phase and quadrature components may cause the received complex symbols or complex values to be different compared to the originally transmitted complex symbols or complex values (which were selected out of the constellation set).

Digital communications systems typically have a unit which determines a link quality indicator (i.e. a measure for the quality of the channel) which is used by the transmitter and the receiver to optimally choose the transmission parameters to counter the amount of corruption generated. As link quality indicator typically a signal to noise ratio (SNR) of the received signal is used. A common measure of the SNR at the receiver is the so-called Error Vector Magnitude (EVM), which is the reciprocal of the SNR (or the negative if both the SNR and the EVM are expressed in decibel). The EVM is typically estimated by determining for the received complex symbol a most likely point out of the constellation set (hereinafter referred to as the original, nominal or assigned location) with a maximum likelihood detection algorithm. A distance (in the 2-dimensional complex space) of the actually received complex symbol or complex value from the most likely original nominal location is then determined, and the average distance forms a measure for the link quality.

There are alternatives disclosed in literature that seek to simplify the process of estimating the EVM, by for example limiting the use of the maximum likelihood detection algorithm. For example Chinese patent application publication CN101938450 discloses a method and a device for measuring a signal to noise ratio of a high order quadrature modulation. The method comprises the steps of transforming a symbol to obtain a corresponding position in a quadrature phase shift keying (QPSK) constellation diagram by performing QAM constellation transformation on the symbol in a high-order QAM constellation diagram; performing signal to noise ratio measurement on the symbol in the QPSK constellation diagram by a maximum likelihood method to obtain a first signal to noise ratio measurement value; and recovering the first SNR measurement value according to the order of the high-order QAM to obtain a second signal to noise ratio measurement value of the high-order QAM.

Further to determining the EVM using a maximum likelihood algorithm, other approaches are known in the art which make use of training sequences. For example patent application publication WO2012/044098 describes one of such approaches applied to a IEEE 802.11n system in which a preamble, known at the receiver side, is transmitted through the system to estimate the SNR without a communication channel estimation process. However prior art approaches as the one described in WO2012/044098 typically introduce a large overhead in the use of an available bandwidth of the communication channel.

SUMMARY OF THE INVENTION

The present invention provides a processor unit, a receiver, a communications system, a method and a computer program as described in the appended claims. Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

FIG. 1 schematically shows a block diagram of an example of an embodiment of a digital communications system.

FIGS. 2a-c show a constellation diagram of complex values in different stages of an example of a modulation scheme and FIG. 2d shows a magnification of a part of the diagram of FIG. 2c.

Elements in the FIGS. are illustrated for simplicity and clarity and have not necessarily been drawn to scale. In the FIGS., elements which correspond to elements already described may have the same reference numerals.

DETAILED DESCRIPTION OF THE PREFERRED EMBODIMENTS

Figure 3:
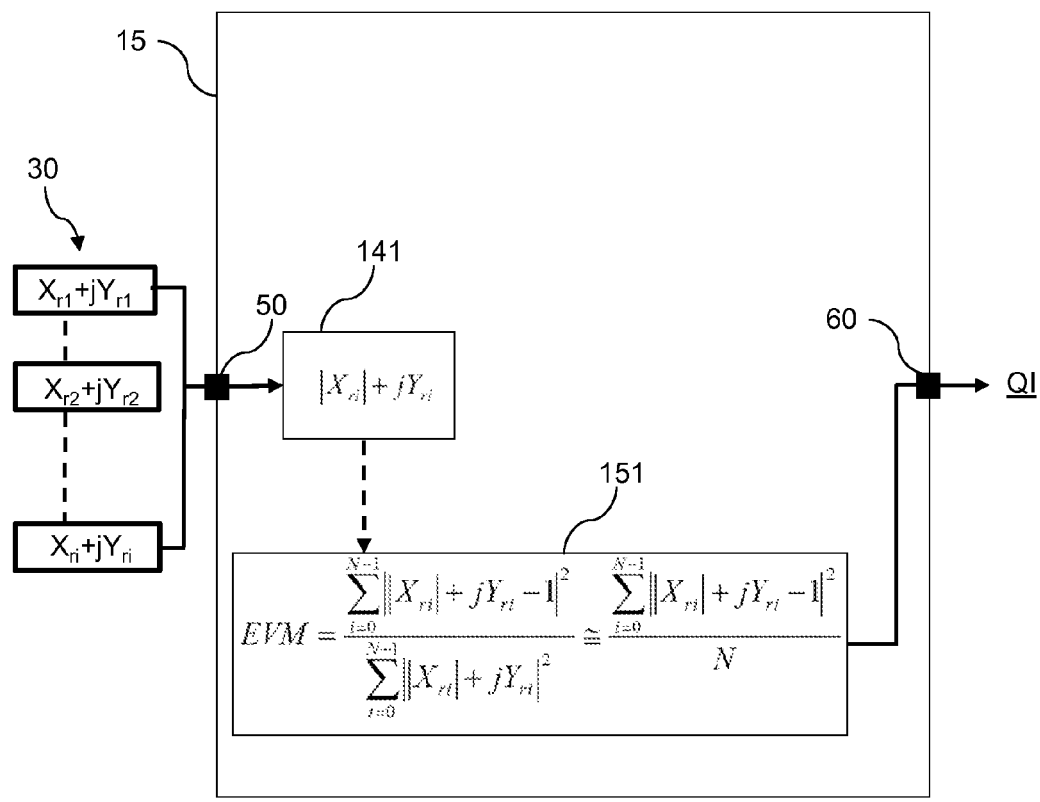
FIG. 3 shows a block diagram of an example of a processor unit.

FIG. 1 shows an example of a digital communications system 200, such as a wired or wireless digital communications system. The digital communications system 200 includes a transmitter 100 and a receiver 110. The transmitter 100 sends to the receiver 110 a signal modulated according to a digital modulation scheme, in order to transmit information, e.g. digital data, to the receiver 110.

The receiver 110 subsequently reconstructs the information from the signal. A value of a modulated parameter of the received signal is determined, at the receiver 110, after the modulated signal is received, and a complex value is construed from the determined value. A predetermined complex value to which the construed complex value corresponds is then sought, e.g. by using a maximum likelihood algorithm or otherwise, i.e. mapped back to a, reconstructed, target value out of the constellation set of the specific modulation scheme, and the digital value assigned to that target value is outputted.

The digital modulation scheme used by the transmitter includes a predetermined mapping of the digital values. A digital value, e.g. formed by a sequence of bits $b_1^i, b_2^i, b_3^i$, etc, to be transmitted is mapped on a mapped complex value $X_{ti}+Y_{ti}$ out of a discrete set 20, hereinafter the constellation set, of at least two predetermined complex values which correspond to a specific value of a modulated parameter. The mapped complex value $X_{ti}+Y_{ti}$ corresponds to a specific value of a modulated parameter, for example the phase, the amplitude or the frequency of the modulated signal, out of a modulation set. E.g. the value of the real part $X_{ti}$ may correspond to a value of the in-phase and the imaginary part $Y_{ti}$ to the quadrature component of the modulation signal. Subsequently, the parameter of the signal is modulated with the specific value corresponding to the mapped complex value and the modulated signal is sent to the receiver 110 through the communication channel 130.

The digital modulation scheme may be any suitable type of digital modulation scheme. The digital modulation scheme may for example have a constellation set with M original nominal locations, each being located in a respective region of the complex plane without other predetermined complex values of the constellation set. The M original nominal locations may for example be distributed in a pattern that may be rotational symmetric with respect to the origin of the two dimensional complex plane, reflectional symmetric with respect to the imaginary axis or the real axis of the complex plane, translational symmetric or otherwise symmetric.

The M-order digital modulation scheme may for example be M-order phase shift keying (M-PSK) in which case the modulated carrier signal is modulated in phase and the M assigned locations are distributed along a circumference with a centre corresponding to the origin of the complex plane.

For example, the M-order digital modulation scheme may have M=2 and be binary phase shift keying, BPSK, in which case the constellation set contains two predetermined complex values, and the symmetry axis between those values separating the two regions from each other may be the real or the imaginary axis, the regions thus being reflection symmetric. In the BPSK modulation, the received complex values are each thus located in a respective one out of the regions.

However, the M-order PSK may have any other suitable value for M, such as 4, 8, 16 etc. For instance, as in the examples of FIGS. 5 and 6, the M-order digital modulation may be quadrature phase shift keying modulation, QPSK, in which case the constellation set contains four assigned locations. The separation between regions can then be defined by the lines from the origin of the complex plane regions that are equidistant to the two closest predetermined complex values out of the constellation set, and the regions are thus rotational symmetric over $\pi/4$ and integer multiples thereof.

As explained in more detail below, FIGS. 2 and 7 illustrate examples using 8-order phase shift keying (8-PSK) where the predetermined complex values at the 8 assigned locations are distributed along said circumference (indicated by the dashed circle) and equidistant from each other by an angle of $\pi/8$. In such case, the separation between regions can be defined by the lines from the origin of the complex plane regions that are equidistant to the two closest predetermined complex values out of the constellation set, and the regions are thus rotational symmetric over $\pi/8$ and integer multiples thereof.

Also, the digital modulation scheme may, in addition or alternatively, modulate another parameter than phase, and e.g. be M-order amplitude shift keying, such as M-order quadrature amplitude modulation, M-QAM, in which case the modulated carrier signal is modulated in amplitude and the M assigned locations are distributed in a regular pattern with a first predetermined pitch along the real axis and a second predetermined pitch along the imaginary axis. The regular pattern may have a symmetric distribution with respect to the origin of the complex real/imaginary diagram.

In such case, the regions are separated by the lines parallel to the imaginary axis equidistant to the two closest predetermined complex values, and the lines parallel to the real axis equidistant to the two closest predetermined complex values, and the regions are thus translational symmetric and the patterns of region in the different quadrants of the complex planes rotational symmetric around the origin and have a symmetry axis in the imaginary axis and the real axis.

As explained in the "background of the invention", the received complex values 30 may be moved away from the M nominal positions of the constellation set because the modulated signal may have been undesirably modified along its way to the receiver 110. A common measure of the level of these undesired modifications is the signal to noise ratio, SNR. This often translates in the computation of the error vector magnitude EVM, which is the inverse of the signal to noise ratio or the negative of the EVM if both the EVM and the SNR are expressed in decibel, i.e.:

$$\text{SNR (dB)} = -\text{EVM (dB)} \quad (1)$$

The EVM may be used for example to enhance the transmission between the transmitter 100 and the receiver 110 by choosing and setting a priori transmission parameters such as for example an appropriate M-order digital modulation scheme, or an appropriate forward-error correction complexity, or a bit-loading depending for example on the propagation transmission conditions that take into account the induced distortion, e.g. for compensating therefor.

The receiver 110 includes a processor unit 10 which is used to estimate the EVM. The processor unit 10 includes an input 50 that receives the received complex values 30 retrieved by a demodulator in the receiver 110. The processor unit 10 includes transformation logic circuitry 140 which is connected to the input 50 of the processor unit 10 and arranged to execute a predetermined sequence of transformations on the received complex values 30 to obtain processed received complex values.

The predetermined sequence of transformations transfers all received complex values 30 on which the sequence of transformation is performed into a single predetermined region containing a single target location corresponding to a predetermined complex value of the constellation set. The transformations of the sequence are one or more of the group consisting of: absolute value calculation, complex number multiplication, complex number subtraction.

Since the received complex values at the original received locations carry useful information plus noise generated in the transmission path from the transmitter 100 through the communication channel 130 to the receiver 110, it can be said that the sequence of transformations removes progressively said useful information from the received original pattern and leaves only noise. Ultimately when all the received complex values are transferred onto the single region of the single target location the useful information contained in the original pattern is removed, or at least significantly reduced so that mainly, if not only, noise is present in the modified pattern. This noise in the modified pattern of the processed received complex values is then used to determine the EVM and eventually the quality indicator QI of the communication channel.

As shown in FIG. 1, the processor unit 10 further includes estimation logic circuitry 150 arranged to determine the above mentioned error vector magnitude EVM as an average distance of all processed received complex values to the single target location.

The processor unit 10 has an output 60 for providing data representing a quality indicator QI of the communication channel 130. The quality indicator QI of the communication channel 130 is determined using the EVM determined in the estimation logic circuitry 150. For example the quality parameter may be determined as in equation (1) by calculating the SNR as the negative of the EVM if both the SNR and the EVM are expressed in Decibels.

By estimating the EVM as an average distance of the processed received complex symbols from the single target location, the estimation of the EVM is simplified. In fact the need to apply special algorithms, such as the maximum likelihood algorithm to the received complex symbols around the original M nominal locations to establish to which one of the original M nominal locations a received complex symbol belongs to, is avoided. Said differently, no decision is required to establish whether a received complex symbol belongs to a particular location of the M nominal locations.

Further to that, since the predetermined sequence of transformations applied on all the received complex symbols carrying the information is sufficient to determine the EVM and the SNR, there is no need of additional training sequences known to the transmitter and to the receiver dedicated to the determination of the EVM and the SNR. Differently from the prior art document WO2012/044098 which uses overhead bandwidth in the communication channel to transmit the training sequences, in the present solution the bandwidth of the communication channel may be fully used to carry only the desired information to be transmitted.

In the following, the operation of the processor unit 10 is further explained with reference to the constellation diagrams of FIGS. 2a-2b which illustrate the mapping of digital values on the points in the constellation set and the reconstruction of the digital value at the receiver side. In the constellation diagrams, complex symbol or complex value are represented showing the real part of the complex symbol or complex value in the abscissa and the imaginary part of the complex symbol or value in the ordinate. FIG. 2a illustrates a mapping of the digital values onto the predetermined complex values a-h of the constellation set at the transmitter side. FIG. 2b illustrates the received complex values 30 being moved away from the original assigned locations of the constellation set. The transfer of the received complex values 30 to the region of the single target location a is illustrated in FIG. 2c, where the received complex values 30 are all transferred to the region containing the selected predetermined mapped complex value a, out of the original nominal locations of the values a-h shown in FIG. 2a and FIG. 2b. Calculation of the EVM is illustrated in FIG. 2d which is a magnification of a part of FIG. 2c, where the processed received complex values $X_{ri}^P + jY_{ri}^P$ have distance $d_i$ from the target location a and distance $|X_{ri}^P + jY_{ri}^P|$ from the origin of the complex plane.

In FIGS. 2a-2b, an 8-PSK is illustrated. However it will be apparent that other modulation schemes such as BPSK, QPSK, QAM, etc. may be used as well, and that the mapping depends upon the M-order digital modulation scheme in use and the specific constellation set thereof. In this respect, M is an integer equal to or greater than 2 and represents the number of points in the constellation set (and hence then number of different digital values that can be transmitted).

FIG. 2a shows the original mapped complex values before transmission in a 8-PSK modulation. As FIG. 2a illustrates, the predetermined complex values of the constellation set form a discrete set of points a-h, each point being in a region without other points, and digital values are each assigned an individual point of the constellation set. The points of the constellation set correspond to a parameter of the modulation signal as follows: the imaginary axis corresponds to the quadrature component of the modulation signal, whereas the real axis corresponds to the in-phase component. As shown, the length of the vector r from the origin to the respective point a corresponds to the signal amplitude, and in this example is a unit length for all original points a-h of the constellation set.

FIG. 2b shows the received complex values. As shown, after transmission from the transmitter 100 and upon reception from the receiver 110 of the received complex symbols 30, the received complex symbols 30 may be moved away around the original eight nominal locations a-h by the undesired modifications which the modulated signal undergoes during transmission from the transmitter 100 and the receiver 110. FIG. 2c shows the processed received complex values transferred to a single predetermined region around the single target location a by a sequence of absolute value calculation and/or, complex number multiplication, and/or complex number subtraction. The number and order of the transformations in the sequence may vary in function of the order and type of modulation scheme.

FIG. 2d shows a magnification of the single predetermined region containing the single target location a of FIG. 2c, which corresponds to the point in the constellation set assigned to the respective digital value. As illustrated, the EVM can be determined as the weighted average of the distance between the processed received complex values $X_{ri}^P + jY_{ri}^P$ and the target location a. For example, the estimation logic circuitry 150 can compute the normalized average distance by executing a series sum of a modulus raised to the power of two of a difference between each of the processed received complex values $X_{ri}^P + jY_{ri}^P$ and the complex value corresponding to the single target location a. The estimation logic circuitry 150 further divides said series sum by another series sum of a modulus raised to the power of two of the distance of each of the processed received complex symbols $X_{ri}^P + jY_{ri}^P$ from the origin of the complex plane. The EVM may be determined by performing operation as described by the mathematical formula:

$$EVM = \frac{\sum_i |d_i|^2}{\sum_i |X_{ri}^p + jY_{ri}^p|^2} \quad (2)$$

The processor unit may be implemented in any manner suitable for the specific implementation. The processor unit may e.g. be a vector signal processor (VSP). The vector signal processor may be any suitable type of vector signal processor, and may for example be implemented as a microprocessor, such as a general purpose microprocessor, a microcontroller, a digital signal processor or other suitable type of microprocessor with vector signal processing cores or coprocessors. The vector signal processor may for example comprise one, two or more vector processing cores, that is central processing units (CPU or cores) or coprocessors, which implement an instruction set containing instructions that operate on arrays of data. In other words the cores or coprocessors may be enhanced for the execution of complex arithmetic operations in parallel by using multiple parallel arithmetic units. Additionally, the vector signal processor may comprise one or more peripherals, such as hardware accelerators, I/O ports, co-processors or otherwise, and/or memory, such as volatile or non-volatile memory, for example on-chip flash or RAM.

The VSP may be arranged to execute complex arithmetic operations on the received complex symbols $X_{ri} + jY_{ri}$ to execute the transformations in the sequence, e.g. by executing a set of instructions, such as a computer program, defining the sequence. The VSP may be a processor which is enhanced to execute arithmetic operations with complex numbers. The VSP may execute operations as changing the sign of a real number, i.e. the real parts or imaginary parts of the received complex symbols $X_{ri} + jY_{ri}$, calculating the modulus of said real parts and/or imaginary parts, making addition, subtraction and multiplications of complex numbers.

The VSP may be configured to execute during a clock signal at least two complex arithmetic operations on the received complex symbols $X_{ri} + jY_{ri}$. When the VSP is used, the complex arithmetic operations on the received complex symbols $X_{ri} + jY_{ri}$ may be executed faster and execution of the transformations in the sequence may be performed more efficiently. For example, the VSP may perform during the same clock cycle either 8 real arithmetical operations that include one multiplication and one addition, or 2 complex arithmetical operations that include one multiplication and one addition.

Figure 11:
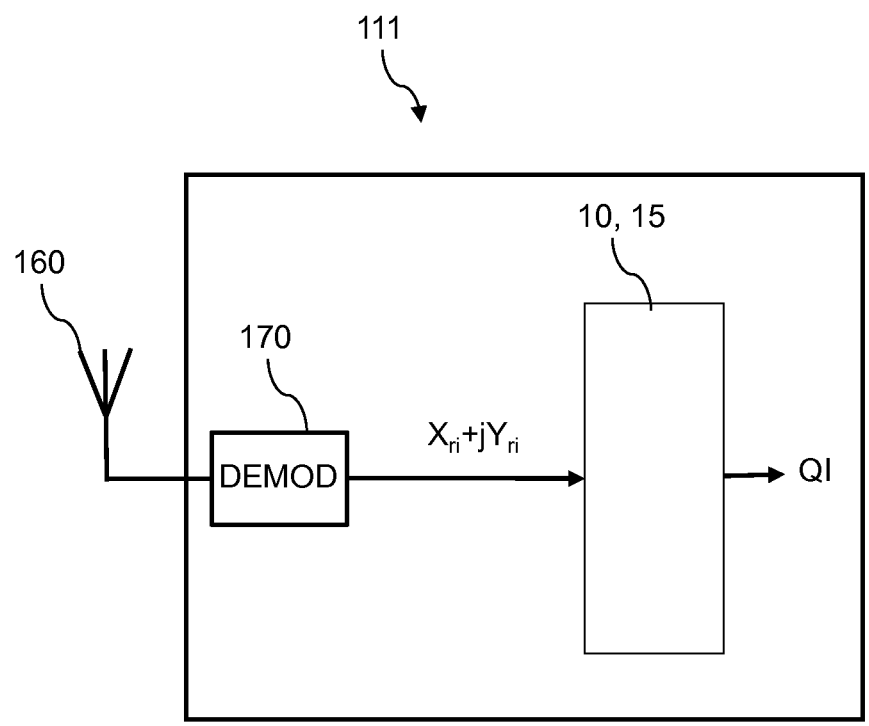
FIG. 11 shows a block diagram of an example of a receiver.

The processor unit may be part of a receiver 111, as shown in FIG. 11. The receiver may for example comprise a transducer 160, e.g. an antenna or other signal receiver, arranged to receive the modulated signal and convert into a signal processable in the receiver. A demodulator DEMOD may be connected to the transducer 160, for determining from the modulated signal a value of a modulated parameter of the signal, and outputting a received complex value $X_{ri} + jY_{ri}$ representing the determined value. The processor unit 10, 15 may be connected to the demodulator DEMOD, to determine as explained a quality indicator of the communication channel from a sequence of received complex values. The determined quality indicator QI may then be used to control the communication between the transmitter and receiver, e.g. by adapting the data rate or the modulation to compensate for non-ideal behaviour induced.

FIG. 3 shows a processor unit 15 that is arranged to determine a quality indicator QI in a communication channel in a binary phase shift keying digital modulation (BPSK). The processor unit 15 includes the transformation logic circuitry 141 arranged to perform the sequence of transformations and the estimation logic circuitry 151 arranged to determine the EVM.

Figure 4A:
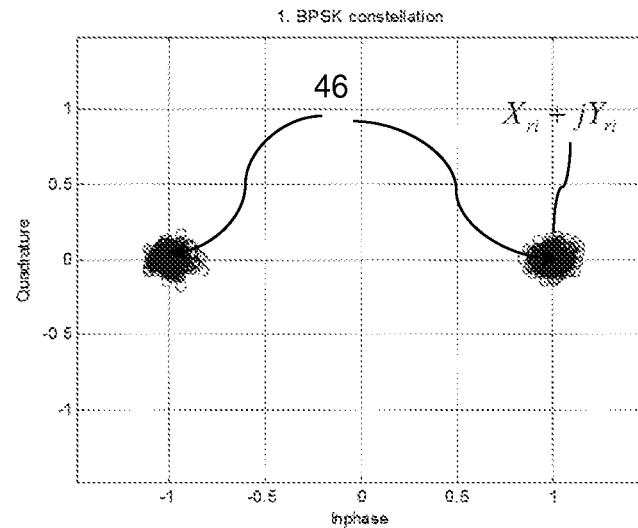
FIGS. 4a-b show a constellation diagram of received complex values for a BPSK modulated signal, before and after executing a sequence of transformations.
Figure 4B:
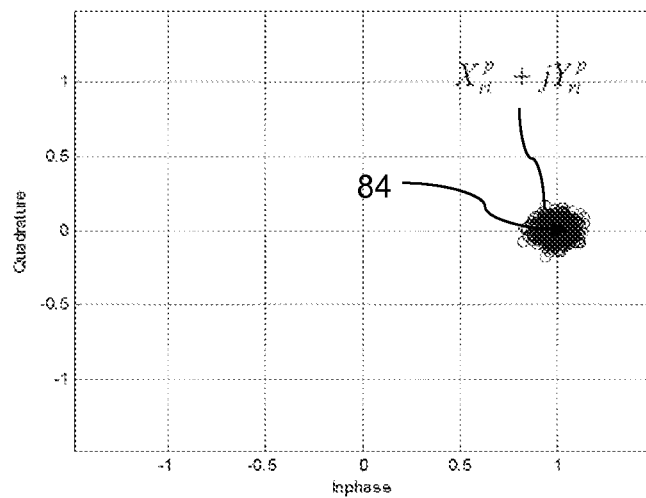

FIGS. 4a-4b schematically show the process that transfers the received complex values $X_{ri} + jY_{ri}$ to the single predetermined region containing the single target location 84. The BPSK digital modulation uses one bit so that the only possible binary combinations are only two, i.e. M=2. The received complex symbols $X_{ri} + jY_{ri}$ may be thus around the two nominal locations 46 of FIG. 4a. In this example the two nominal locations 46 are located on the real axis. The single target location 84 can be on the positive part of the real axis, in this case the sequence of transformations may include only one transformation which is a selective modification of the sign of the real parts of the received complex symbols $X_{ri} + jY_{ri}$ around the nominal location 46 with negative real part, i.e. $X_{ri}^P + jP_{ri}^P = |X_{ri}| + jY_{ri}$. Alternatively when the nominal locations are located in the imaginary axis (not shown in the FIGS.), the single target location can be on the positive part of the imaginary axis, and in this case the sequence of transformations may include only one transformation which is a selective modification of the sign of the imaginary parts of the received complex symbols $X_{ri} + jY_{ri}$ around the nominal location with negative imaginary part. The estimation logic circuitry 151 may be arranged to determine the EVM as the normalized average distance of the processed received complex symbols $X_{ri}^P + Y_{ri}^P$ to the single target location 84, i.e.:

$$EVM = \frac{\sum_{i=0}^{N-1}||X_{ri}|+j|Y_{ri}|-1|^2}{\sum_{i=0}^{N-1}||X_{ri}|+j|Y_{ri}||^2} \cong \frac{\sum_{i=0}^{N-1}||X_{ri}|+j|Y_{ri}|-1|^2}{N} \quad (3)$$

Figure 5A:
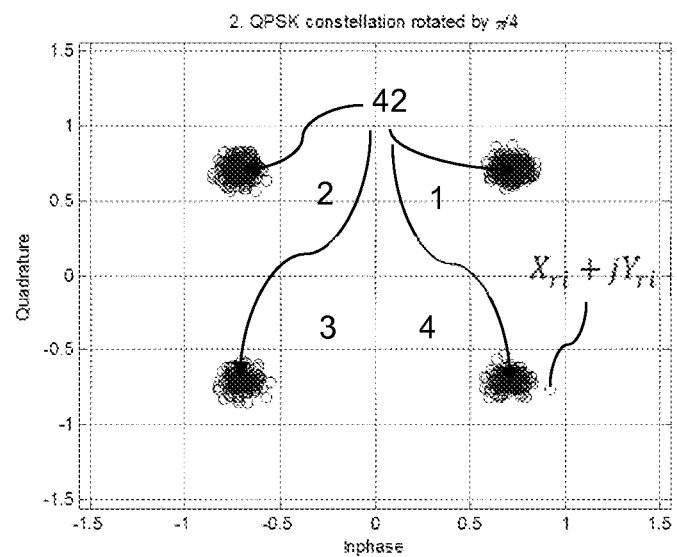
FIGS. 5a-b show constellation diagrams of received complex values for a QPSK modulated signal, before and after executing a sequence of transformations.
Figure 5B:
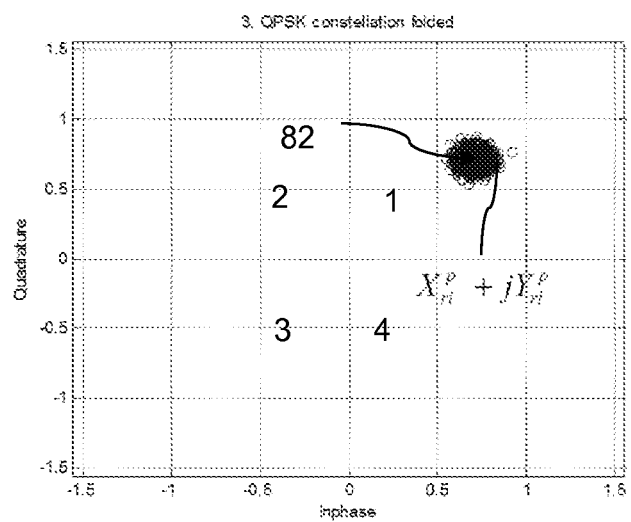

FIG. 5a and FIG. 5b show another example of a transfer process to the single predetermined region used to determine the quality indicator in a QPSK digital modulation. It will be apparent that this transfer process may be implemented in the processor unit so far described. The QPSK uses digital symbols of 2 bits and M=2²=4 and maps the combination of these two bits onto complex symbols at four nominal locations of the complex real/imaginary diagram. The constellation diagram of the received complex symbols in the QPSK is shown in FIG. 5a wherein the received complex symbols $X_{ri}+jY_{ri}$ are part of received regions comprising the original four nominal locations 42. In this example, the number of transformations is equivalent to one. In order to map all received complex symbols $X_{ri}+jY_{ri}$ onto the single target location 82, it may be sufficient to execute a modification of a sign of the real part and/or of the imaginary part of said original received complex symbols $X_{ri}+jY_{ri}$ around the original four nominal locations 42. As shown in FIG. 5b, the single target location 82 can be chosen in the first quadrant 1 of the complex real/imaginary diagram. In this case it may be sufficient to compute the modulus of the real parts and of the imaginary parts of all received complex symbols $X_{ri}+jY_{ri}$, to obtain the processed received complex symbols $X_{ri}^P+jY_{ri}^P$ around the single target location 82. After one transformation, the processed received complex symbols $X_{ri}^P+jY_{ri}^P$ are located around the single target location 82 and the EVM is estimated as the normalized average distance of all the processed received complex symbols $X_{ri}^P+jY_{ri}^P$ to the complex coordinate of the single target location 82, which is in this case $$e^{j\frac{\pi}{4}}.$$

For an N number of received complex symbols $X_{ri}+jY_{ri}$, wherein $0 \leq i \leq N-1$, the EVM is determined as follows:

$$EVM = \frac{\sum_{i=0}^{N-1}||X_{ri}|+j|Y_{ri}|-e^{j\frac{\pi}{4}}|^2}{\sum_{i=0}^{N-1}||X_{ri}|+j|Y_{ri}||^2} \cong \frac{\sum_{i=0}^{N-1}||X_{ri}|+j|Y_{ri}|-e^{j\frac{\pi}{4}}|^2}{N} \quad (4)$$

The results obtained in relation to a QPSK digital modulation, may be generalized for an M-order PSK digital modulation using digital symbols of two or more bits. For such M-order PSK digital modulation, if T positive integer, is the number of transformations in the predetermined sequence of transformations, the number T of transformations may include:
- k−1 transformations of a first type, i.e. modifying the sign of the real part or of the imaginary part of the respective complex symbol,
- k−2 rotations, i.e. transformations of a second type.

k is a positive integer larger than one and M=2^k. In this example the number T of transformation is thus equivalent to the sum of the number of transformations k−1 of the first type with the number k−2 of rotations, i.e. T=2k−3. Each one of the k−2 rotations may be executed after each of the k−1 transformations of the first type.

The single target location can be chosen, e.g., with positive real part and positive imaginary part, i.e. in the first quadrant 1 of the complex real/imaginary diagram. In that case, the k−1 transformations of the first type may consist of computing the modulus of the real part and the imaginary part of each one of the received complex symbols to obtain after each of the k−1 transformations of the first type, $$\frac{M}{2^i}$$

corresponding modified regions containing respective nominal locations in a modified pattern where i is an integer $1 \leq i < k$ indicating the iteration number of the k−1 transformations of the first type in the sequence.

Alternatively, the single target location can be chosen in a different quadrant than the first quadrant 1, and the modification of the sign of the real parts and/or of the imaginary parts of each one of the received complex symbols may be chosen to map the received complex symbols onto the target location at the correct quadrant.

Similarly, in this generalization, the k−2 rotations may consist of computing a multiplication of each one of the respective received complex symbols of each of the $$\frac{M}{2^i}$$

corresponding modified regions by the complex amount $$e^{-j\frac{2\pi}{M}}.$$

to obtain a rotation of each one of said respective received complex symbol by $$-\frac{2\pi}{M}$$

so as to provide a modified pattern of the processed complex symbols where the respective original nominal locations are symmetric about the real axis or the imaginary axis. The obtained rotation is in this example clockwise. Alternatively the rotation may be executed by the same complex amount but with the exponent with opposite sign to obtain an anticlockwise rotation.

By choosing the single target location with positive real part and positive imaginary part, the execution of the T transformation is further simplified because the processor unit may only compute the modulus of the real parts and the imaginary parts of the received complex symbols in order to execute the k−1 transformations of the first type. Furthermore by only computing the modulus, it may not be necessary to know the position of each of the received complex symbol in the complex real/imaginary diagram.

Figure 6A:
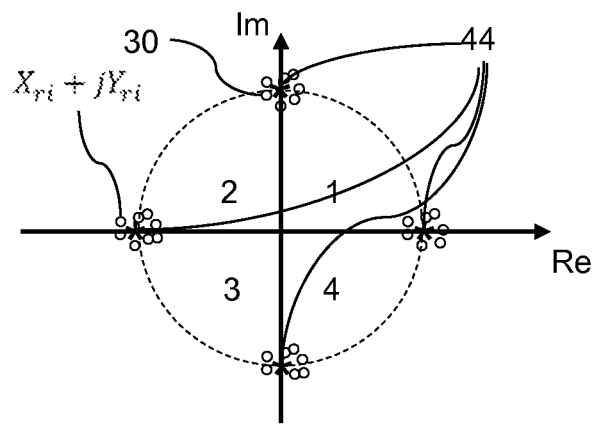
FIGS. 6a-c show constellation diagrams of received complex values for a QPSK modulated signal, before, during and after executing a sequence of transformations.
Figure 6B:
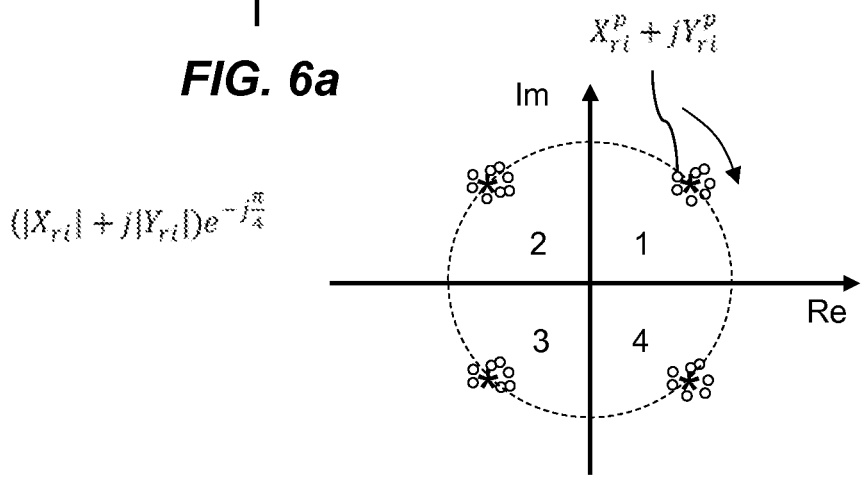
Figure 6C:
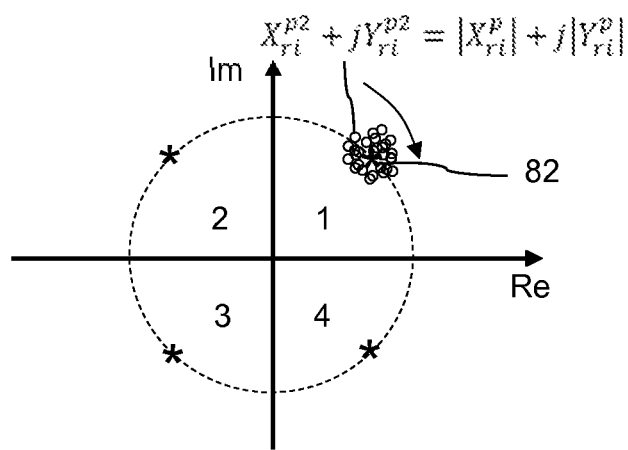

FIGS. 6a-6c schematically show the transfer process involved in determining the quality indicator of the communication channel in another QPSK digital modulation. FIG. 6a illustrates the pattern of received regions including the received complex symbols $X_{ri}+jY_{ri}$, FIG. 6b illustrates the pattern of the processed received complex symbols $X_{ri}^{p}+jY_{ri}^{p}$ after a first transformation and FIG. 6c shows the processed received complex symbols $X_{ri}^{p2}+jY_{ri}^{p2}$ after a second transformation. The received complex symbols $X_{ri}+jY_{ri}$ are all transferred around the single target location 82. FIG. 6a differs from the constellation diagram of FIG. 5a in that the four nominal locations 44 of FIG. 6a are on the real axis and imaginary axis of the complex real/imaginary diagram. In this example, the transformation logic circuitry 140 may be arranged to execute first a rotation by $$\frac{\pi}{4}$$

as shown in the passage from FIG. 6a to FIG. 6b and then a computation of the modulus of the real parts and of the imaginary parts of the firstly processed received complex symbols $X_{ri}^{p}+jY_{ri}^{p}$ obtained from the first rotation. Thus in this example the sequence of transformations includes two transformations: one rotation and one modification of the signs of the real and imaginary parts of the firstly processed received complex symbols $X_{ri}^{p}+jY_{ri}^{p}$. The EVM may be then determined as the normalized average distance of all secondly processed received complex symbols $X_{ri}^{p2}+jY_{ri}^{p2}$ around the single target location 82 to the single target location 82. For a N number of processed received complex symbols $X_{ri}^{p}+jY_{ri}^{p}$, wherein $0 \leq i \leq N-1$, the EVM may be determined as follows:

$$EVM = \frac{\sum_{i=0}^{N-1}||X_{ri}^{p}|+j|Y_{ri}^{p}|-e^{j\frac{\pi}{4}}|^2}{\sum_{i=0}^{N-1}||X_{ri}^{p}|+j|Y_{ri}^{p}||^2} \cong \frac{\sum_{i=0}^{N-1}||X_{ri}^{p}|+j|Y_{ri}^{p}|-e^{j\frac{\pi}{4}}|^2}{N} \quad (5)$$

In the example of FIGS. 6a-6c the single target location 82 does not coincide with any one of the original nominal locations 44 but it is at a predetermined offset of one original nominal location by $$\frac{\pi}{4}.$$

All received complex symbols $X_{ri}+jY_{ri}$ are transferred to the predetermined region containing the single target location 82 which is translated by the predetermined offset, i.e.

$$\frac{\pi}{4}$$

in this example, with respect to one of the nominal locations 44. The modified regions where the firstly processed received complex values $X_{ri}^{p}+jY_{ri}^{p}$ are located, and the single target location 82 around which the received complex symbols $X_{ri}+jY_{ri}$ are all transferred, are at a predetermined offset, i.e. in the example $$\frac{\pi}{4},$$

from the original locations 44 illustrated in FIG. 6a. In this example, the estimation logic circuitry 150 may determine the EVM by computing the normalized average distance of the secondly processed received complex symbols $X_{ri}^{p2}+jY_{ri}^{p2}$ to the single target location 82 which is located at a predetermined offset from one of the original locations 44.

Further, in the example shown through FIGS. 6a-6c, by beginning the sequence of transformations with a transformation of the second type, i.e. a rotation, the number of transformations in the sequence to obtain the secondly processed received complex symbols $X_{ri}^{p2}+jY_{ri}^{p2}$ around the single target location 82 is reduced compared to the case in which the sequence of transformations would begin with a transformation of the first type, i.e. modifying the sign of the real or imaginary part of the respective received complex symbols $X_{ri}+jY_{ri}$.

FIGS. 7a-7d illustrate the transfer process of the received complex symbols $X_{ri}+jY_{ri}$ onto a single predetermined region comprising the processed complex symbols $X_{ri}^{p3}+jY_{ri}^{p3}$ and the single target location in a 8-PSK digital modulation. FIGS. 7a to 7d schematically show the sequence of T transformations that may be executed by the transformation logic circuitry 140 to map the received complex symbols $X_{ri}+jY_{ri}$ around the original nominal locations 40 onto processed received complex symbols $X_{ri}^{p3}+jY_{ri}^{p3}$ around the predetermined single target location 80 with a minimum number of T transformations.

Figure 7A:
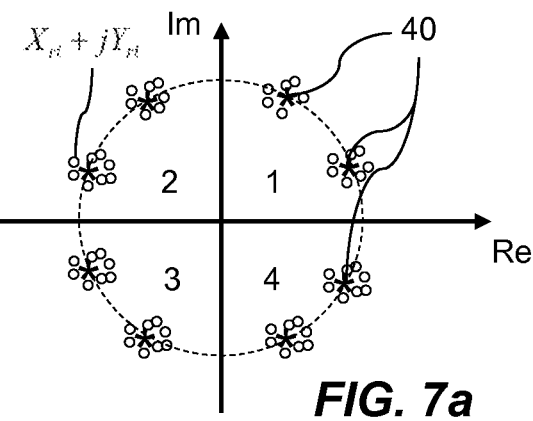
FIGS. 7a-d show constellation diagrams of received complex values for an 8-PSK modulated signal, before, during and after executing a sequence of transformations.
Figure 7B:
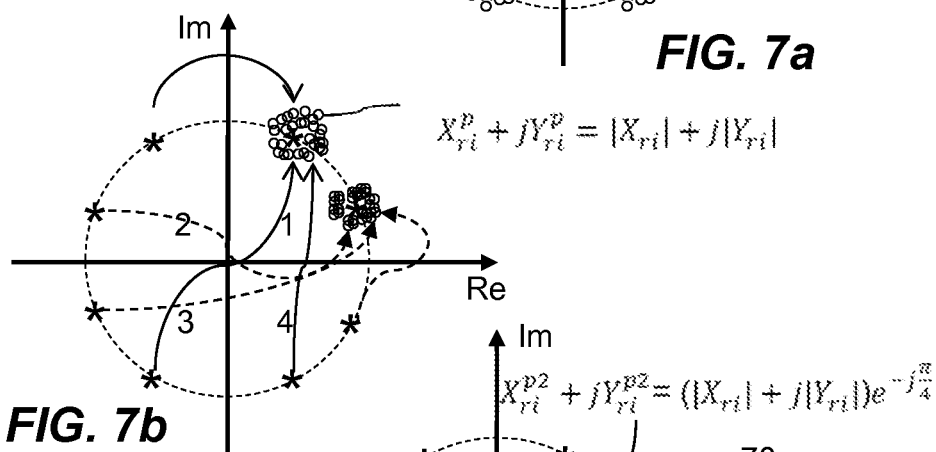
Figure 7C:
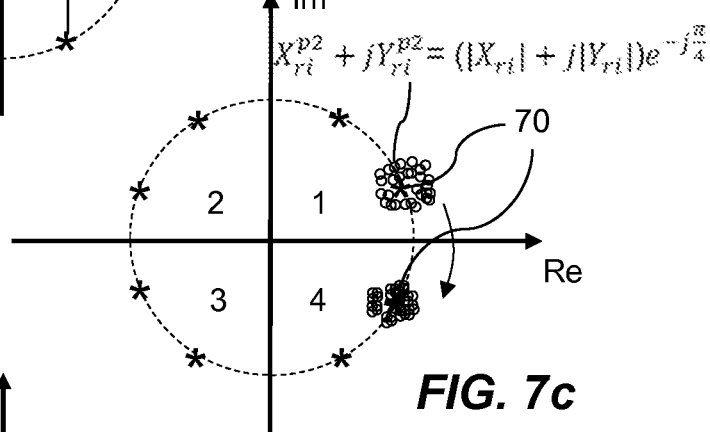

In the passage from FIG. 7a to FIG. 7b, only one transformation of the first type may be executed to map the received complex symbols $X_{ri}+jY_{ri}$ around the six nominal locations in the second, third and fourth quadrants 2, 3 and 4 directly onto regions around the two nominal locations on the first quadrant 1. In this last mentioned example the signs of the real parts and the signs of the imaginary parts of the received complex symbols around the two nominal locations on the third quadrant 3 are modified, the signs of only the real parts of the received complex symbols around the two nominal locations on the second quadrant 2 are modified and the signs of only the imaginary parts of the received complex symbols around the two nominal locations on the fourth quadrant 4 are modified. After that all received complex symbols $X_{ri}+jY_{ri}$ are processed to obtain processed received complex symbols $X_{ri}^{p}+jY_{ri}^{p}$ around the two respective nominal locations on the first quadrant 1, then a transformation of the second type may be applied, i.e. in this example a rotation, schematically shown in the passage from FIG. 7b to FIG. 7c to obtain secondly processed received complex symbols:

$$X_{ri}^{p2}+jY_{ri}^{p2} = (|X_{ri}|+j|Y_{ri}|)e^{-j\frac{\pi}{4}}.$$

The secondly processed received complex symbols $X_{ri}^{p2}+jY_{ri}^{p2}$ are transferred into regions comprising the predetermined complex values 70 selected out of the set of the original predetermined complex values 40. After the rotation again another transformation of the first type may be applied, schematically shown in the passage from FIG. 7c to FIG. 7d, so as to obtain thirdly processed received complex symbols as follows: $X_{ri}^{p3}+jY_{ri}^{p3}=|X_{ri}^{p2}|+j|Y_{ri}^{p2}|$. Once all the received complex symbols are mapped onto the predetermined region containing the predetermined single target location 80, the EVM may be estimated as a normalized average distance of all processed received complex symbols around the predetermined single target location 80, to the predetermined single target location 80.

For a N number of secondly processed received complex symbols $X_{ri}^{p2}+jY_{ri}^{p2}$ the estimation logic circuitry 150 may be arranged to determine the EVM as follows:

$$EVM = \frac{\sum_{i=0}^{N-1}\left\||X_{ri}^{p2}|+j|Y_{ri}^{p2}|-\exp(j\pi/8)\right\|^2}{\sum_{i=0}^{N-1}\left\||X_{ri}^{p2}|+j|Y_{ri}^{p2}|\right\|^2} \cong \frac{\sum_{i=0}^{N-1}\left\||X_{ri}^{p2}|+j|Y_{ri}^{p2}|-\exp(j\pi/8)\right\|^2}{N} \quad (6)$$

In the last example the single target location 80 and the corresponding modified locations coincide with the original nominal locations of the constellation diagram of the 8-PSK modulation.

In another example the processor unit may comprise transformation logic circuitry and estimation logic circuitry to determine the EVM and the quality parameter of the communication channel 130 in a M-order quadrature amplitude (QAM) digital modulation wherein the predetermined mapped complex symbols are distributed in the complex real/imaginary diagram in a regular pattern. The regular pattern may have a first predetermined pitch in a direction of the real axis of the complex real/imaginary diagram and a second predetermined pitch in a direction of the imaginary axis. In this last example the sequence of T transformations may include an operation of moving each received complex symbol in a modified pattern of regions by a complex amount so that the respective nominal locations of the regions are symmetric with respect to both the real axis and the imaginary axis, i.e. symmetric to the origin. The complex amount has a real part that may be a multiple integer of the first predetermined pitch and an imaginary part that may be a multiple integer of the second predetermined pitch.

If 2n is the number of bits of the complex symbols at the M nominal locations then the sequence of T transformation includes:

In transformations of the first type, i.e. transformations that modify the sign of the real parts and/or of the imaginary parts of the received complex symbols or processed received complex symbols, and n−1 transformations of the second type, i.e. transformations that move each processed received complex symbol by a complex amount. Each one of the n−1 transformations of the second type may be executed by the transformation logic circuitry 140 after each one of the n transformation of the first type. Therefore for an M-order QAM, the number of T transformations may be equivalent to the sum of the n−1 transformations of the first type with the n transformations of the second type, i.e. T=2n−1.

As an example of an M-QAM digital modulation, FIGS. 8a-8d shows the transfer process of the received regions comprising received complex symbols $X_{ri}+jY_{ri}$ onto a single predetermined region comprising the processed complex symbols $X_{ri}^{p3}+jY_{ri}^{p3}$ and the single target location 88 in a 16-QAM. In this example the processor unit may comprise estimation logic circuitry for determining the EVM in a 16-QAM. FIG. 8a to FIG. 8d show the T transformations that may be executed by the transformation logic circuitry to determine the EVM.

Figure 8A:
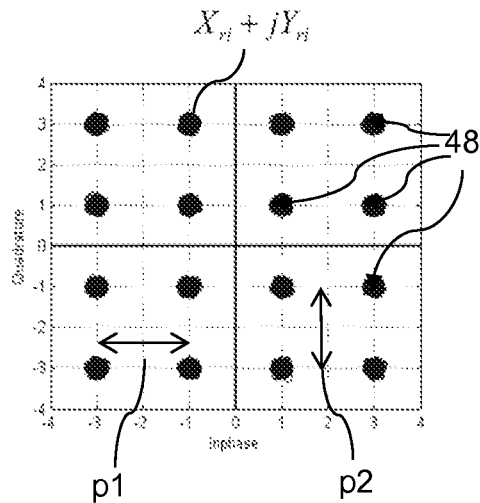
FIGS. 8a-d show constellation diagrams of received complex values for an M-QAM modulated signal, before, during and after executing a sequence of transformations.

The constellation diagram shown in FIG. 8a has 16 nominal locations 48 of the complex symbols in a regular pattern that is symmetric to the origin of the complex real/imaginary diagram. This regular pattern has a first predetermined pitch p1 on the real axis direction which is equivalent to a second predetermined pitch p2 in the imaginary axis direction. The received complex symbols $X_{ri}+jY_{ri}$ are located around the 16 nominal locations 48. Each received complex symbol $X_{ri}+jY_{ri}$ is a binary combination of four bits, i.e. $M=2^{2n}=16$, where n is equivalent to two and 2n, i.e. four, is equivalent to the number of bits of the M digital symbols. In this example the number of T transformations of the sequence that may be executed by the transformation logic circuitry to obtain processed received complex symbols $X_{ri}^{p3}+jY_{ri}^{p3}$ around a single target location 88 on the first quadrant 1 of the complex real/imaginary diagram may be equivalent to three.

Figure 8B:
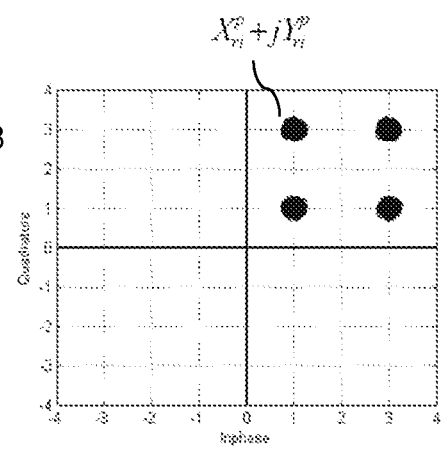
Figure 8D:
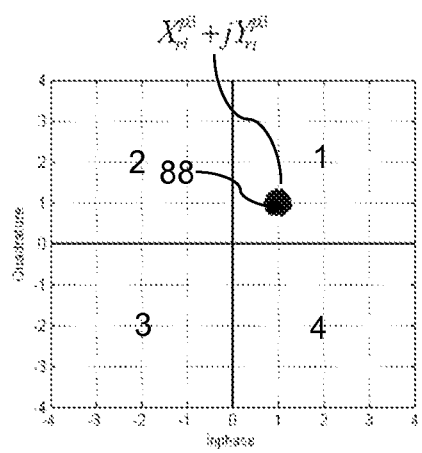

FIG. 8b shows the first transformation of the sequence that modifies the sign of the real parts and the imaginary parts of the received complex symbols $X_{ri}+jY_{ri}$ in the 16 received regions 48 by applying the modulus on said real parts and imaginary parts to obtain a modified pattern of the processed received complex symbols $X_{ri}^{p}+jY_{ri}^{p}=|X_{ri}|+j|Y_{ri}|$ around four corresponding modified regions comprising respective four nominal locations. The four corresponding modified nominal locations on the first quadrant 1 correspond to four of the 16 original nominal locations 48.

Figure 8C:
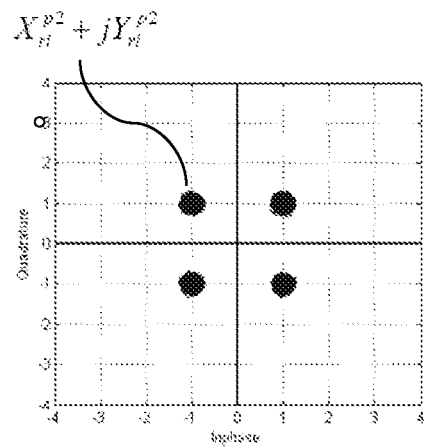

FIG. 8c shows the second transformation of the sequence that moves the modified pattern obtained with the first transformation by a complex amount to obtain another modified pattern symmetric about the origin of the complex real/imaginary diagram. The real part and the imaginary part of the predetermined complex amount depend upon the first predetermined pitch p1 or the second predetermined pitch p2 of the original constellation diagram shown in FIG. 8a.

If the first predetermined pitch p1 in the real axis direction is equivalent to two times the real part of the predetermined complex value with the smallest real part and equivalent to the second predetermined pitch p2 in the imaginary axis direction then the predetermined complex amount is equivalent to $$\frac{M}{2^{n+i}}(1+j) = 2^{n-i}(1+j),$$

where M is the order of QAM, n is half the number of bits used in the M-order QAM and i is a positive integer corresponding to the number of moving transformations in the sequence of T transformations. To explain further, for a first transformation in the sequence of T transformations of moving the modified pattern, i=1; for a second transformation in the sequence of moving another modified pattern, i=2, etc.

In the example of FIG. 8c, the second transformation of the sequence is a first transformation of moving the modified pattern, i.e. i=1 and the complex amount is equivalent to 2+2j. The second transformation shown in FIG. 8c then translates the modified pattern shown in FIG. 8b by 2+2j. The secondly processed received complex symbols $X_{ri}^{p2}+jY_{ri}^{p2}$ indicated in the FIG. 8c with a "p2" subscript are equivalent to:

$$X_{ri}^{p2}+jY_{ri}^{p2}=(|X_{ri}^{p}|+j|Y_{ri}^{p}|)-(2+2j) \quad (7)$$

Figure 7D:
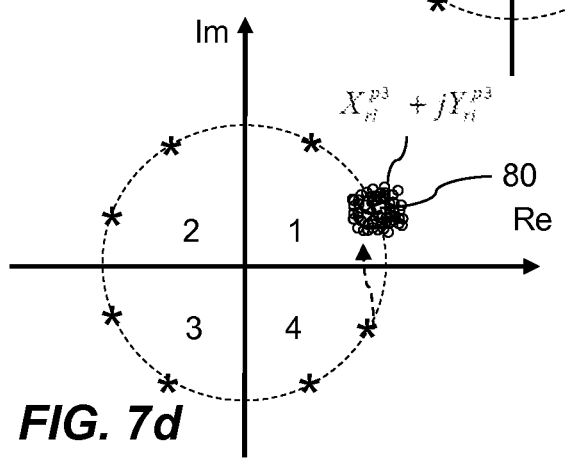

FIG. 7d shows the third and last transformation of the sequence of T transformations. The third transformation shown in FIG. 8d modifies the sign of the real parts and of the imaginary parts of the secondly processed received complex symbols $X_{ri}^{p2}+jY_{ri}^{p2}$ in the modified pattern shown in FIG. 7c to obtain a further modified pattern of thirdly processed received complex symbols $X_{ri}^{p3}+jY_{ri}^{p3}$ around the predetermined single region containing the single target location 88 in the first quadrant 1. The single target location 88 of this example is equivalent to one of the 16 original nominal locations shown in FIG. 8a. Eventually the EVM may be determined as the normalized average distance of the thirdly processed received complex symbols $X_{ri}^{3p}+jY_{ri}^{3p}$ to the single target location 88 in the single predetermined region. For N thirdly processed received complex symbols $X_{ri}^{3p}+jY_{ri}^{3p}$ the EVM is equivalent to:

$$EVM = \frac{\sum_{i=0}^{N-1}|X_n^{p3}+jY_n^{p3}-(1+j)|^2}{\sum_{i=0}^{N-1}|X_n^{p3}+jY_n^{p3}|^2} \cong \frac{\sum_{i=0}^{N-1}|X_n^{p3}+jY_n^{p3}-(1+j)|^2}{N} \quad (8)$$

Figure 9:
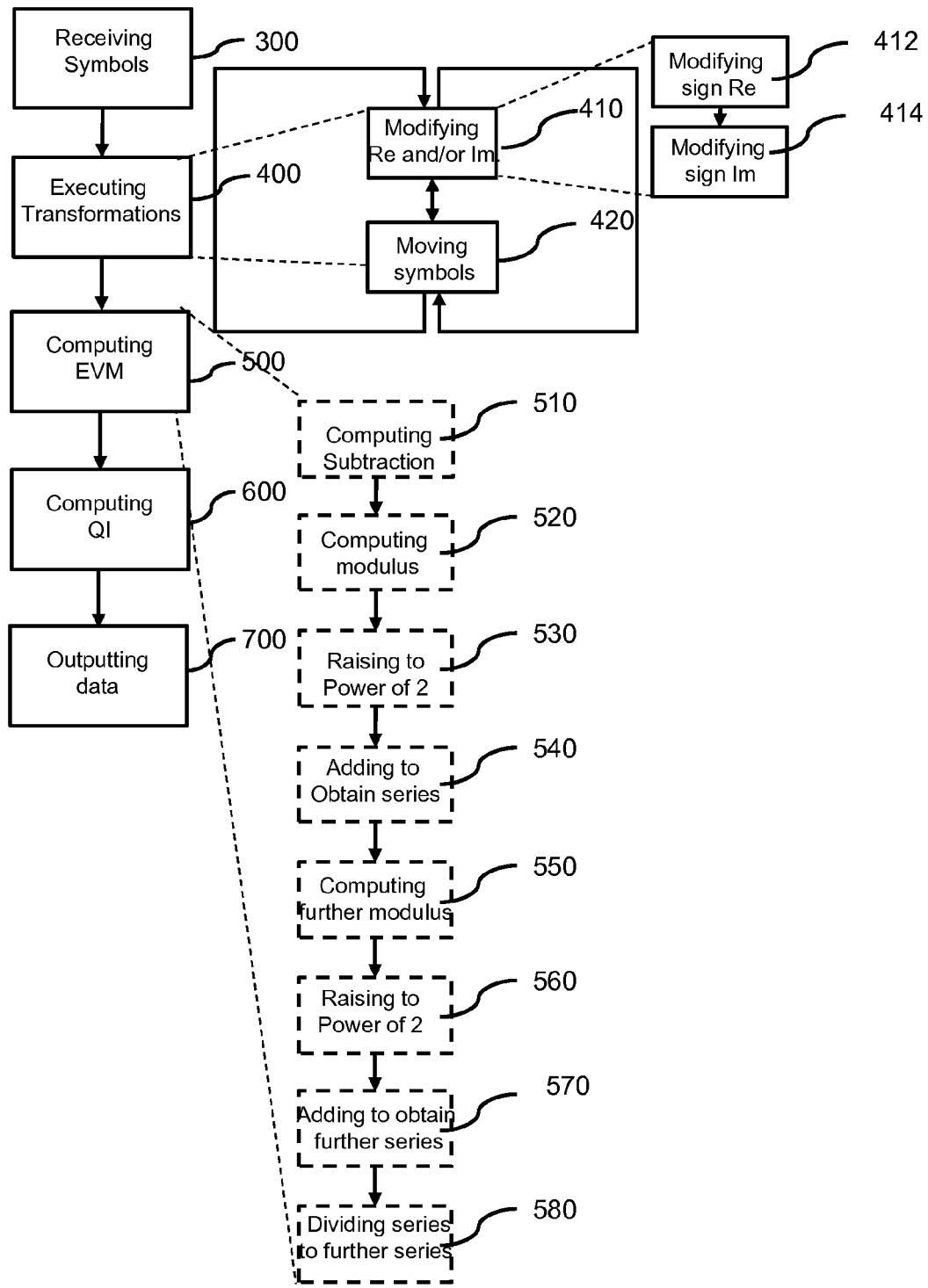
FIG. 9 schematically shows a flow chart of a method of determining a quality indicator of a digital communication channel.

FIG. 9 schematically shows a flow chart of a method of determining a quality indicator of a communication channel. The method may be performed by the processing unit 10, e.g. in the digital communication system 200 of FIG. 1 or in the receiver of FIG. 11. With reference to FIG. 9 the method includes:

receiving 300 data representing received complex values 30, the received complex values consist of a real part and an imaginary part, representing a determined value of a modulated parameter of a received signal transmitted over the communication channel 130, the modulated parameter is modulated according to a digital modulation scheme.

The digital modulation scheme uses a mapping of a digital value on a mapped complex value out of a constellation set 20 of at least two predetermined complex values as shown in FIG. 1 and described therefor. Each predetermined mapped complex value corresponds to a specific value of the modulated parameter, and modulation of the parameter with the specific value corresponds to the mapped complex value. Each predetermined complex value is located in a respective one of at least two regions in the complex space. The modulated parameter may be for example phase, amplitude or frequency of a modulated signal and the digital modulation scheme may be any suitable digital modulation scheme: for example BPSK, QPSK, M-PSK, M-QAM, etc.

The method further includes:
executing 400 a predetermined sequence of transformations on the received complex values 30 to obtain processed received complex values in a single predetermined region containing a single target location. The transformations are one or more of the group consisting of: absolute value calculation, complex number multiplication, complex number subtraction;

computing 500 an average distance of all the processed received complex values 30 to the single target location to obtain the EVM;

computing 600 the quality indicator from the determined EVM;

outputting 700 data representing the quality indicator QI.

Further the executing 400 the predetermined sequence of transformations may include:
a) modifying 410 a sign of a real part and/or a sign of an imaginary part of the received complex values 30 to change the pattern of regions in which respective received complex values are located so that the respective received complex values in a first region are transferred to a second region, and/or
b) moving 420 each received complex value by a complex amount.

In the predetermined sequence of transformations modifying 410 the sign of said real part and/or the sign of said imaginary may include:

modifying 412 the sign of the imaginary part of a respective complex value if the sign differs from the sign of the imaginary part of the predetermined complex value in the second region unless the predetermined complex value in the second region is located on the real axis, and modifying 414 the sign of the real part of a respective complex value if the sign differs from the sign of the real part of the predetermined complex value in the second region unless the predetermined complex value in the second region is located on the imaginary axis.

The complex amount may be predetermined so as to move the original pattern or the modified pattern to be symmetric with respect to one or both axis of the complex real/imaginary diagram.

The predetermined number of transformations in the sequence is one or more, and if it is larger than 1 the modifying 410 and moving 420 are alternating in the predetermined sequence of transformations until all received regions are transferred to the single predetermined region containing the single target location.

As shown in FIG. 9 the modifying 410 operation and the moving 420 operation may alternate so as to provide a sequence of T transformations beginning with the modifying 410 operation alternated by the moving 420 operation and again the modifying 410 operation. Alternatively modifying 410 and moving 420 may alternate in the sequence of T transformations so as to provide a sequence beginning with moving 420 alternated by the modifying 410 and again by the moving 420. Each modifying 420 may consist of one or more extra modifying 412 the sign of the imaginary part and modifying 414 the sign of the real part of a respective complex symbol.

With reference to FIG. 9, computing 500 the EVM may further include:

IV) subtracting 510 each one of the processed received complex symbols in the predetermined single region with a further complex amount corresponding to the respective single target location a, 82, 84, 86 or 88 to obtain a corresponding subtraction for each of the processed received complex symbols around said single target location a, 82, 84, 86 or 88, V) computing 520 a modulus for each of the obtained subtraction, VI) raising 530 to the power of two each one of the obtained modulus to obtain a series of modulus each one raised to power of two for all the processed received complex symbols in the predetermined single region, VII) adding 540 the obtained modulus of the series to obtain a series sum of all obtained modules of the series, VIII) computing 550 a further modulus for each one of the processed received complex symbols in the single predetermined region containing the single target location a, 82, 84, 86 or 88, IX) raising 560 to the power of two each one of the obtained further modulus to obtain a further series of further modulus each one raised to the power of two, X) adding 570 the obtained further modulus raised to the power of two of the further series to obtain a further series sum of all obtained further modulus of the further series, XI) dividing 580 said series sum with said further series sum to obtain said average distance.

Figure 10:
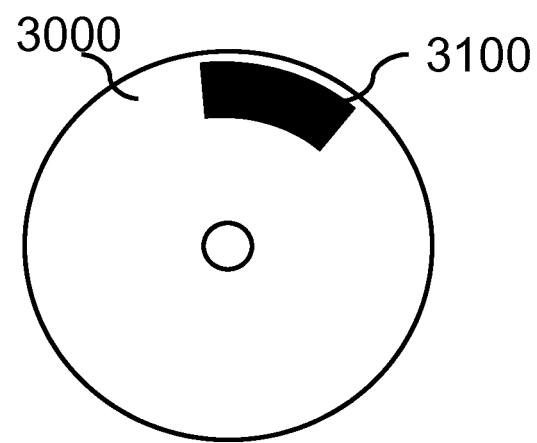
FIG. 10 shows schematic view of an example of a computer readable medium.

FIG. 10 shows an example of a tangible non-transistor computer readable medium 3000 on which data is stored representing a computer program 3100 for running on a processor unit, at least including code portions for performing a method determining a quality indicator of a communication channel as previously described when run on a programmable apparatus, such as a vector signal processor. The computer program 3100 may be embodied on the computer readable medium 3000 as physical marks or by means of magnetization of the computer readable medium 3000. However, any other suitable embodiment is conceivable as well. The computer readable storage medium may be stored internally to the programmable apparatus or connectable thereto via a transmission medium. The computer readable media may be permanently, removably or remotely coupled to the programmable apparatus. Furthermore, it will be appreciated that, although the computer readable medium 3000 is shown in FIG. 9 as an optical disc, the computer readable medium 3000 may be any suitable computer readable medium, such as a hard disk, solid state memory, flash memory, etc., and may be non-recordable or recordable.

In the foregoing specification, the invention has been described with reference to specific examples of embodiments of the invention. It will, however, be evident that various modifications and changes may be made therein without departing from the broader scope of the invention as set forth in the appended claims, and that the claims are not limited to the specific examples shown.

For example, devices functionally forming separate devices may be integrated in a single physical device. Also, the units and circuits may be suitably combined in one or more semiconductor devices. For example the receiver 110 or 111 may be integrated in a single chip with the processor unit 10 or 15. Alternatively the processor unit 10 or 15 of FIG. 1 or 3 may be implemented in another chip than the chip where other parts of the receiver 110 or 11 not directly involved with the determination of the EVM may be integrated. Further, any of the processor units 10 or 15 described through the description and the FIGS. may include other hardware components such as memories, processors or any other suitable apparatuses suitable for the application.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processor unit for determining a quality indicator, QI, of a communication channel, comprising:
    an input for receiving received complex values consisting of a real part and an imaginary part and representing a determined value of a modulated parameter of a received signal transmitted over the communication channel,
    the modulated parameter being modulated according to a digital modulation scheme using a mapping of a digital value on a mapped complex value out of a constellation set, the constellation set being discrete and containing at least two predetermined complex values, each corresponding to a specific value of the modulated parameter, each predetermined complex value being located in a respective one of at least two regions in complex space, the region being without other predetermined complex values, and modulation of the parameter with the specific value corresponding to the mapped complex value;
    the processor unit further comprising:
        transformation logic circuitry connected to the input and arranged to perform a predetermined sequence of transformations on the received complex values to obtain processed received complex values, which transfer all the received complex values on which the sequence of transformations is performed into a single predetermined region out of said at least two regions, the predetermined region containing a single target location in complex space corresponding to one of the at least two predetermined complex values in the constellation set, the transformations being one or more of the group consisting of: absolute value calculation, complex number multiplication, complex number subtraction;
        estimation logic circuitry arranged to determine the error vector magnitude, EVM, as an average of the distance of the processed received complex symbols to the single target location; and
        an output for outputting data representing the quality indicator, QI, determined using the determined error vector magnitude, EVM.

2. A processor unit as claimed in claim 1, wherein the transformations comprise:
    modifying a sign of a real part and/or a sign of an imaginary part of the received complex values; and/or
    moving each received complex value by a complex amount;
    wherein the modifying changes a pattern of regions in which the received complex values are located, so that the received complex values in a first region are transferred to a second region.

3. A processor unit according to claim 2, wherein the modifying comprises:
    modifying the sign of the imaginary part of a respective received complex value if the sign differs from the sign of the imaginary part of the predetermined complex value in the second region unless the predetermined complex value in the second region is located on the real axis, and
    modifying the sign of the real part of a respective complex value if the sign differs from the sign of the real part of the predetermined complex value in the second region unless the predetermined complex value in the second region is located on the imaginary axis.

4. A processor unit as claimed in claim 1, wherein the predetermined complex values are distributed along a circumference having a centre at the origin of the complex plane, and wherein the moving is rotating along the circumference.

5. A processor unit as claimed in claim 1, wherein the predetermined complex values are distributed in the complex plane in a regular pattern with a first predetermined pitch in a direction of the real axis and a second predetermined pitch in another direction of the imaginary axis, and wherein the predetermined complex amount has a real part which is a multiple integer of the first predetermined pitch, and an imaginary part which is multiple integer of the second predetermined pitch so as to move the pattern to be symmetric to both the real axis and the imaginary axis.

6. A processor unit as claimed in claim 1, wherein the single target location is at a predetermined offset from one of the at least two predetermined complex values.

7. A processor unit as claimed in claim 1, wherein the estimation logic circuitry is further arranged to:
   execute a series sum of a modulus raised to the power of two of a difference of each one of the processed received complex values with a further complex amount corresponding to the single target location; and
   divide said series sum by another series sum of a module raised to the power of two of each one of the processed received complex values around said single particular location.

8. A processor unit as claimed in claim 1, wherein the digital modulation scheme is an M-order phase shift keying digital modulation having M predetermined complex values, and wherein the predetermined sequence of transformations comprises:
   k−1 times the modifying the sign, and
   k−2 times the rotating,
   wherein k is a positive integer larger than 1 and $M=2^k$, and wherein each one of the k−2 times the rotating is executed after a modifying the sign.

9. A processor unit as claimed in claim 8, wherein the single target location has a positive real part and a positive imaginary part, and wherein:
   the k−1 times modifying the sign comprises computing the modules of the real part and the imaginary part of each of the received complex values to obtain, after each of the k−1 operations of modifying the sign, to move the received complex values into $$\frac{M}{2^i}$$

regions, i being an integer and 1≤i<k, and
   the k−2 times rotating each complex value comprises computing a multiplication of each one of the respective received complex values by the complex amount $$e^{-j\frac{2\pi}{M}}$$

to obtain a rotation of each one of said respective received complex value by $$-\frac{2\pi}{M}.$$

10. A processor unit as claimed in claim 1, wherein the digital modulation is an M-order quadrature amplitude modulation, and wherein the sequence of transformations comprises:
   n times modifying the sign, and
   n−1 times moving, wherein n is a positive integer and $M=4^n$, and wherein each of the n−1 times moving is executed after one of the n times modifying the sign.

11. A processor unit as claimed in claim 10, wherein the single target location has a positive real part and a positive imaginary part, wherein the first predetermined pitch is equivalent to the second predetermined pitch, and wherein:
   the n times modifying the sign comprises computing the modules of the real part and the imaginary part of each of the received complex values to obtain after each of the n times modifying the sign, to move the received complex values into $$\frac{M}{2^i}$$

regions, being an integer and 1≤i<n, and
   the n−1 times moving each symbols comprises a subtraction of each of the received complex symbols by $$\frac{M}{2^{n+i}}(1+j),$$

wherein the first predetermined pitch or second predetermined pitch is equivalent to 2 times the real part of the predetermined complex value with the smallest real part.

12. A processor unit as claimed in claim 1, wherein the M-order digital modulation scheme is 2-order phase shift keying, and wherein the predetermined sequence of transformations consists of one time modifying the sign of the real part.

13. A processor unit as claimed in claim 12, wherein the single target location has a positive real part and zero imaginary part, and wherein:
   the one time modifying the sign comprises computing the modulus of the real part of each one of the received complex value to transfer after the one time the modifying the sign, the received complex values to the single predetermined region.

14. A receiver, comprising:
   a transducer for receiving a modulated signal over a communication channel and converting the modulated signal into a signal processable in the receiver;
   a demodulator connected to the transducer, for determining from the modulated signal a value of a modulated parameter of the signal, and outputting a received complex value representing the determined value;
   a processor unit as claimed in claim 1 connected to the demodulator, for determining a quality indicator, QI, of the communication channel from a sequence of received complex values.

15. A digital communications system, comprising a receiver as claimed in claim 14 and further comprising a transmitter and the communication channel, wherein the transmitter is arranged to transmit information from the transmitter to the receiver through the communication channel.

16. A method of determining a quality indicator, QI, of a communication channel, comprising:
   receiving data representing received complex values, the received complex values consisting of a real part and an imaginary part, representing a determined value of a modulated parameter of a received signal transmitted over the communication channel, the modulated parameter being modulated according to a digital modulation scheme, the digital modulation scheme using:

a mapping of a digital value on a mapped complex value out of a constellation set, the constellation set being discrete and containing at least two predetermined complex values, each predetermined complex value corresponding to a specific value of the modulated parameter, each predetermined complex value being located in a respective one of at least two regions in complex space, the region being without other predetermined complex values, and modulation of the parameter with the specific value corresponding to the mapped complex value;

executing a predetermined sequence of transformations on the received complex values to obtain processed received complex values in a single predetermined region containing a single target location, the transformations being one or more of the group consisting of: absolute value calculation, complex number multiplication, complex number subtraction;

computing an average distance of all the processed received complex symbols to the single target location to obtain the error vector magnitude, EVM;

computing the quality indicator from the determined EVM;

outputting data representing the quality indicator.

17. The method as claimed in claim 16, wherein the executing the predetermined sequence of transformations comprises:

modifying a sign of a real part and/or a sign of an imaginary part of the received complex values to change a pattern of regions in which respective received complex values are located so that the respective received complex values in a first region are transferred to a second region, and/or moving each received complex symbol by a complex amount.

18. A non-transitory computer readable medium embodying a computer program comprising instructions for causing a processor unit to perform the method as claimed in claim 17.

* * * * *